(12) United States Patent
Lin et al.

(10) Patent No.: US 12,382,417 B2
(45) Date of Patent: Aug. 5, 2025

(54) PARAMETERS HANDLING FOR SNPN-ENABLED UE

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW)

(73) Assignee: MEDIATEK Inc., Singapore (TW)

( * ) Notice: Subject to any disclaimer, the term of this patent is extended or adjusted under 35 U.S.C. 154(b) by 299 days.

(21) Appl. No.: 17/668,832

(22) Filed: Feb. 10, 2022

(65) Prior Publication Data
US 2022/0286996 A1 Sep. 8, 2022

Related U.S. Application Data

(60) Provisional application No. 63/156,974, filed on Mar. 5, 2021.

(51) Int. Cl.
*H04W 60/04* (2009.01)
*H04W 8/18* (2009.01)
*H04W 12/06* (2021.01)
*H04W 84/04* (2009.01)

(52) U.S. Cl.
CPC .......... *H04W 60/04* (2013.01); *H04W 8/183* (2013.01); *H04W 12/068* (2021.01); *H04W 84/042* (2013.01)

(58) Field of Classification Search
CPC ... H04W 60/04; H04W 8/183; H04W 12/068; H04W 84/042; H04W 84/105; H04W 12/06; H04W 12/08; H04W 24/02; H04W 28/24; H04W 40/02
See application file for complete search history.

(56) References Cited

U.S. PATENT DOCUMENTS

| | | | |
|---|---|---|---|
| 2021/0051577 A1 | 2/2021 | Won | |
| 2021/0105712 A1* | 4/2021 | Speicher | H04W 60/04 |
| 2022/0116462 A1* | 4/2022 | Cai | H04L 67/51 |

(Continued)

OTHER PUBLICATIONS

ETSI TS 124 368 V16.4.0 (Jul. 2020) (Year: 2020).*

(Continued)

*Primary Examiner* — Sharmin Chowdhury
(74) *Attorney, Agent, or Firm* — Helen Mao; Zheng Jin; Imperium Patent Works (57) ABSTRACT

A method of handling parameters of a subscribed network upon accessing a selected Stand-alone Non-Public Network (SNPN) using credentials from a credential holder is proposed. The UE selects an SNPN using a configured list of subscriber data, e.g., based on SNPN selection parameters contained in a selected entry of the list of subscriber data, or selects the SNPN based on SNPN selection parameters associated with a PLMN subscription of a USIM card. The UE accesses the selected SNPN using credentials supplied by a subscribed network, which is identified by the selected entry or by the USIM card. Upon successful registration to the selected SNPN, the UE applies a list of 3GPP PS_Data_Off exempt services that is different from a configured list of 3GPP PS_Data_Off exempt services associated with the selected entry, and evaluates a URSP that is different from the pre-configured URSP of the subscribed network.

20 Claims, 5 Drawing Sheets

(56) References Cited

U.S. PATENT DOCUMENTS

2023/0084094 A1* 3/2023 Youn ................... H04W 76/16
                                                      370/331

OTHER PUBLICATIONS

China Intellectual Property Office Action 202210210741.7, dated Dec. 19, 2023 (6 pages).
Taiwan IPO, office action for the Taiwanese patent application 111107924 (No. English translation is available), dated Nov. 9, 2022 (17 pages).
3GPP TS 24.501 V17.1.0, Technical Specification Group Core Network and Terminals; Non-Access- Stratum (NAS) protocol for 5G System (5GS); Stage 3; (Release 17), Sections 4.11, 5.5.1.2.5, 6.1.1, 6.2.9.2, 6.2.10, dated Dec. 2020 (746 pages).
3GPP TR 23.700-07 V1.2.0, Technical Specification Group Services and System Aspects; Study on enhanced support of non-public networks (Release 17), Sections 6.1.2, 6.2.1, 6.2.3.2.3, 6.4.2.2, 6.8.2.3, 6.10.2, 6.11.1, 6.18.2.2, 6.18.3.1, 6.28.2, 6.39.3, 6.46.2.1, 8.1.1, 8.1.4, 8.1.5, 8.4.1, 8.4.2, dated Nov. 2020 (246 pages).

* cited by examiner

LIST OF SUBSCRIBER DATA

```
Entry X (subscription X)                                              400
--------------------------------------------------------------------------
1. subscriber identifier (ID 10)
2. credentials (Credential 10)
3. SNPN identity of the subscribed SNPN (SNPN ID-10)
4. pre-configured URSP: URSP-X

- USER CONTROLLED PRIORITIZED LIST OF PREFERRED SNPNs
     SNPN ID = SNPN-11
     SNPN ID = SNPN-12
- CREDENTAIL HOLDER CONTROLLED PRIORITIZED LIST OF PREFERRED SNPNs
     SNPN ID = SNPN-13
     SNPN ID = SNPN-14
- CREDENTIAL HOLDER CONTROLLED PRIORITIZED LIST OF GINS
     GIN = GIN-1001 (ASSUME SNPN-15, SNPN-16 BROADCAST GIN-1001)
     GIN = GIN-1002 (ASSUME SNPN-17, SNPN-18 BROADCAST GIN-1002)
--------------------------------------------------------------------------
A list of 3GPP PS-data-off exempt services to be used in the SNPN for entry X
```

PARAMETERS HANDLING FOR SNPN-ENABLED UE

CROSS REFERENCE TO RELATED APPLICATIONS

This application claims priority under 35 U.S.C. § 119 from U.S. Provisional Application No. 63/156,974, entitled "Parameters Handling for SNPN-enabled UE That Supports Access to an SNPN Using Credentials from a Separate Entity", filed on Mar. 5, 2021, the subject matter of which is incorporated herein by reference.

TECHNICAL FIELD

The disclosed embodiments relate generally to wireless mobile communication network, and, more particularly, to method of parameters handling for Stand-alone Non-Public Network-enabled (SNPN-enabled) UE that supports access to an SNPN using credentials from a separate entity.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated IP network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include 2G GERAN (GSM) radio access network, 3G UTRAN (UMTS) radio access network, 4G E-UTRAN (LTE), 5G new radio (NR) radio access network, and other non-3GPP access RAT including WiFi.

As compared to PLMN, a non-public network (NPN) is a 5GS deployed network for non-public use. An NPN is either a Stand-alone Non-Public Network (SNPN), i.e., operated by an NPN operator and not relying on network functions provided by a PLMN; or a Public Network Integrated NPN (NPI-NPN), i.e., a non-public network deployed with the support of a PLMN. The combination of a PLMN ID and Network identifier (NID) identifies an SNPN. A UE may be enabled for SNPN. The UE selects an SNPN for which it is configured with a subscriber identifier and credentials. The UE can have several sets of subscriber identifiers, credentials, and SNPN identities.

The 5G system enables an NPN to request a third-party service provider to perform NPN authentication of a UE based on identities and/or credentials supplied by the third-party service provider. The 5G system enables an NPN to request a PLMN to perform NPN authentication of a UE based on identities and/or credentials supplied by the PLMN. A 5G system enables an SNPN to be able to request another SNPN (third-party service provider) to perform SNPN authentication of a UE based on identities and/or credentials supplied by the other SNPN (the third-party service provider). Specifically, an SNPN-enabled UL can support access to an SNPN using credentials from a credential holder. Such UE can be configured with a "list of subscriber data" containing one or more entries. Each entry of the list of subscriber data consists of information on a subscribed SNPN (which is a credential holder) with a pre-configured UE Route Selection Policy (URSP). Each entry also consists of SNPN selection parameters for the purpose of access to an SNPN using credentials from the credential holder. When the UE selects an entry of the "list of subscriber data", and then accesses an SNPN using credentials supplied in the selected entry by the subscribed SNPN, a mechanism is desired on URSP handling when establishing a PDU session and 3GPP PS_Data_Off exempt services handling.

SUMMARY

A method of handling parameters of a subscribed network upon accessing a selected Stand-alone Non-Public Network (SNPN) using credentials from a credential holder is proposed. The UE selects an SNPN using a configured list of subscriber data, e.g., based on SNPN selection parameters contained in a selected entry of the list of subscriber data, or selects the SNPN based on SNPN selection parameters associated with a PLMN subscription of a USIM card. The UE accesses the selected SNPN using credentials supplied by a subscribed network (e.g., acting as the credential holder), which is identified by the selected entry or by the USIM card. Upon successful registration to the selected SNPN, the UE evaluates a URSP that is different from the pre-configured URSP of the subscribed network supplied in the selected entry. The UE also applies a list of 3GPP PS_Data_Off exempt services that is different from a configured list of 3GPP PS_Data_Off exempt services of the subscribed network associated with the selected entry or PLMN subscription of a USIM card.

In one embodiment, a UE maintains stand-alone non-public network (SNPN) selection parameters. The UE is enabled to access to SNPNs using credentials from a credential holder. The UE selects an SNPN based on a set of SNPN selection parameters corresponding to selected subscription information of a subscribed network. The selected subscription information has subscription parameters comprising at least one of a pre-configured UE route selection policy (URSP) and a list of configured 3GPP PS_Data_Off exempt services associated with the selected subscription information. The UE registers to the selected SNPN using credentials supplied by the selected subscription information. The UE establishes a PDU session upon successful registration. The UE applies a first list of 3GPP PS_Data_Off exempt services that is different from the configured list of 3GPP PS_Data_Off exempt services associated with the selected subscription information. In one example, the UE evaluates another URSP that is different from the pre-configured URSP.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
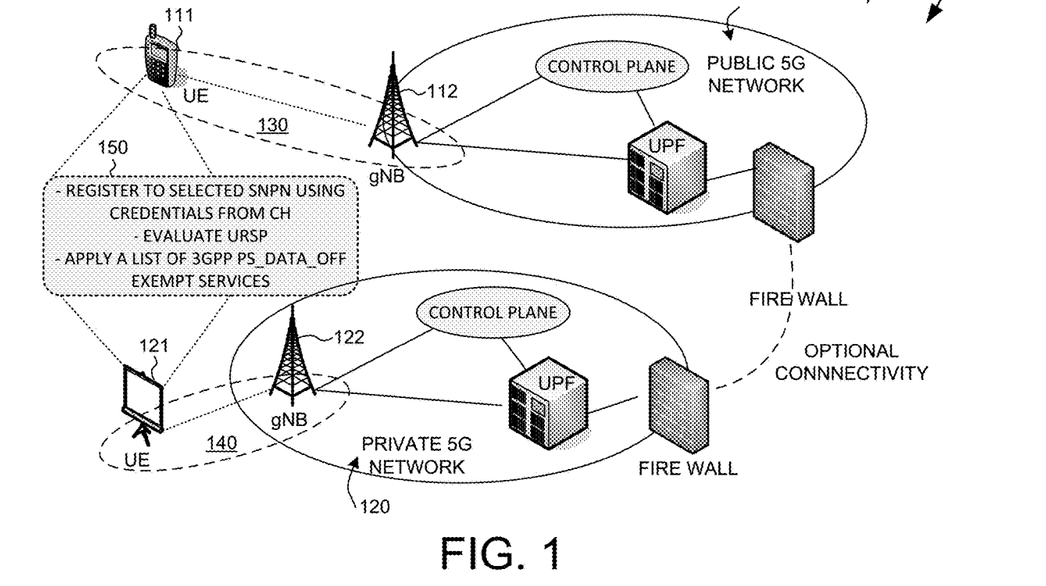
FIG. 1 schematically shows a communication system 100 having a Public Land Mobile Network (PLMN) and a Stand-alone Non-public Network (SNPN) with URSP handling for an SNPN-enabled UE that supports access to an SNPN using credentials from a credential holder in accordance with one novel aspect.

FIG. 1 schematically shows a communication system 100 having a Public Land Mobile Network (PLMN) 110 and a Stand-alone Non-public Network (SNPN) 120 with URSP handling for an SNPN-enabled UE that supports access to an SNPN using credentials from a separate entity in accordance with one novel aspect. PLMN network 110 comprises control plane functionalities, user plane functionality (UPF), and application servers that provides various services by communicating with a plurality of user equipments (UEs) including UE 111. UE 111 and its serving base station gNB 112 belong to part of a radio access network RAN 130. RAN 130 provides radio access for UE 111 via a radio access technology (RAT), e.g. 3GPP access and non-3GPP access. A mobility management entity (MME) or an access and mobility management function (AMF) in PLMN 110 communicates with gNB 112, and other serving GW and PDN GW for access and mobility management of wireless access devices in PLMN 110 (not shown).

Similarly, SNPN network 120 comprises control plane functionalities, user plane functionality (UPF), and application servers that provides various services by communicating with a plurality of user equipments (UEs) including UE 121. UE 121 and its serving base station gNB 122 belong to part of a radio access network RAN 140. RAN 140 provides radio access for UE 121 via a radio access technology (RAT), e.g. 3GPP access and non-3GPP access. A MME or AMF in SNPN 120 communicates with gNB 122, and other serving GW and PDN GW for access and mobility management of wireless access devices in SNPN 120 (not shown). UE 111 or 121 may be equipped with a radio frequency (RF) transceiver or multiple RF transceivers for different application services via different RATs.

The 5G system enables an NPN to request a third-party service provider to perform NPN authentication of a UE based on identities and/or credentials supplied by the third-party service provider. The 5G system enables an NPN to request a PLMN to perform NPN authentication of a UE based on identities and/or credentials supplied by the PLMN. A 5G system enables an SNPN to be able to request another SNPN (third-party service provider) to perform SNPN authentication of a UE based on identities and/or credentials supplied by the other SNPN (the third-party service provider). Specifically, an SNPN-enabled UE can support access to an SNPN using credentials from a credential holder (CH). Such UE can be configured with "a list of subscriber data" containing one or more entries. Each entry, which represents a subscribed SNPN acting as a credential holder, consists of SNPN selection parameters for the purpose of access to a selected SNPN using credentials from the CH.

Based on SNPN selection parameters provided by the list of subscriber data, a UE can select an entry of "a list of subscriber data", and attempt to register to a selected SNPN using credentials from the subscribed SNPN. If the registration to the selected SNPN is successful, the UE gains access to the selected SNPN and is able to establish PDU sessions for data transmission and reception. The selected entry of the list of subscriber data also consists of other subscription parameters of the subscribed SNPN, including a pre-configured UE Route Selection Policy (URSP) and associated with other subscription parameters of the subscribed SNPN, including a list of 3GPP PS_Data_Off exempt services. However, it may not be suitable for the HE to use those parameters (e.g., the pre-configured URSP and the list of 3GPP PS_Data_Off exempt services) in the selected entry or associated with the subscribed SNPN when the HE accesses to another selected SNPN that is different from the subscribed SNPN.

In accordance with one novel aspect, a method of handling parameters by a UE upon accessing an SNPN using credentials from a credential holder is proposed (150). A UE is configured with a "list of subscriber data" containing one or more entries. Each entry of the "list of subscriber data" consists of subscription parameters including: a) a subscriber identifier; b) credentials; and c) an SNPN identity of the subscribed SNPN; d) a pre-configured URSP. Additionally, a list of 3GPP PS_Data_Off exempt services configured in the UE is to be used for (associated with) the SNPN of the selected entry. In order to support access to an SNPN using credentials from a credential holder, each entry of the list of subscriber data further comprises "SNPN selection parameters", which consisting of: 1) a user controlled prioritized list of preferred SNPNs, where each entry contains an SNPN identity; 2) a credential holder controlled prioritized list of preferred SNPNs, where each entry contains an SNPN identity; and/or 3) a credential holder controlled prioritized list of Group IDs for Network Selection (GINs). Additionally, if the UE has a USIM with a PLMN subscription, the UE may be configured with the SNPN selection parameters as described above, associated with the PLMN subscription.

The UE selects an SNPN using the configured list of subscriber data, e.g., based on the SNPN selection parameters contained in a selected entry (a subscribed SNPN) of the list of subscriber data. Based on the selected entry, the UE selects an SNPN, and then tries to access the selected SNPN using credentials supplied by the subscribed SNPN. Upon successful registration to the selected SNPN, UE runs an application or makes a voice call and needs to evaluate URSP to determine the parameters of the PDU session to be established. UE may also need to know which service belongs to the list of 3GPP PS_Data_Off exempt services. While the entry of the list of subscribed data has a pre-configured URSP and there exists a configured list of 3GPP PS_Data_Off exempt services to be used in the subscribed SNPN of the selected entry, the UE should choose to use another URSP, and another list of 3GPP PS_Data_Off exempt services, that are specifically configured for the selected SNPN, and are different from the pre-configured URSP and the list of 3GPP PS_Data_Off exempt services.

Figure 2:
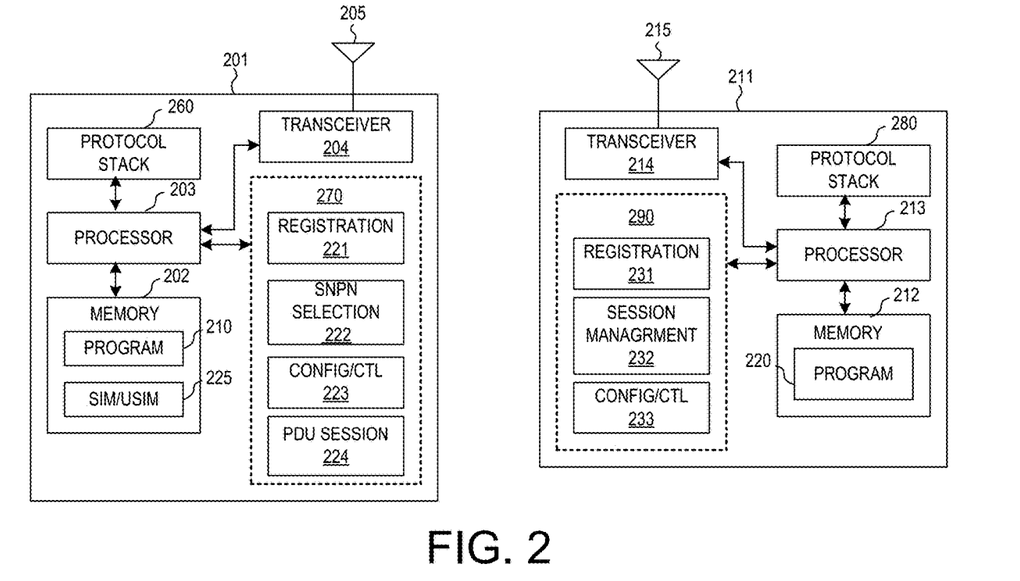
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session management circuit 232 handles session management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration and mobility procedure with the network, a SNPN selection circuit 222 that handles SNPN selection based on SNPN selection parameters, a config and control circuit 223 that handles configuration and control parameters, and a PDU session handling circuit 224 that handles PDU session, performs URSP rule matching, and applies PS_Data_Off feature. Note that the SNPN selection parameters may be stored in UE memory.

Figure 3:
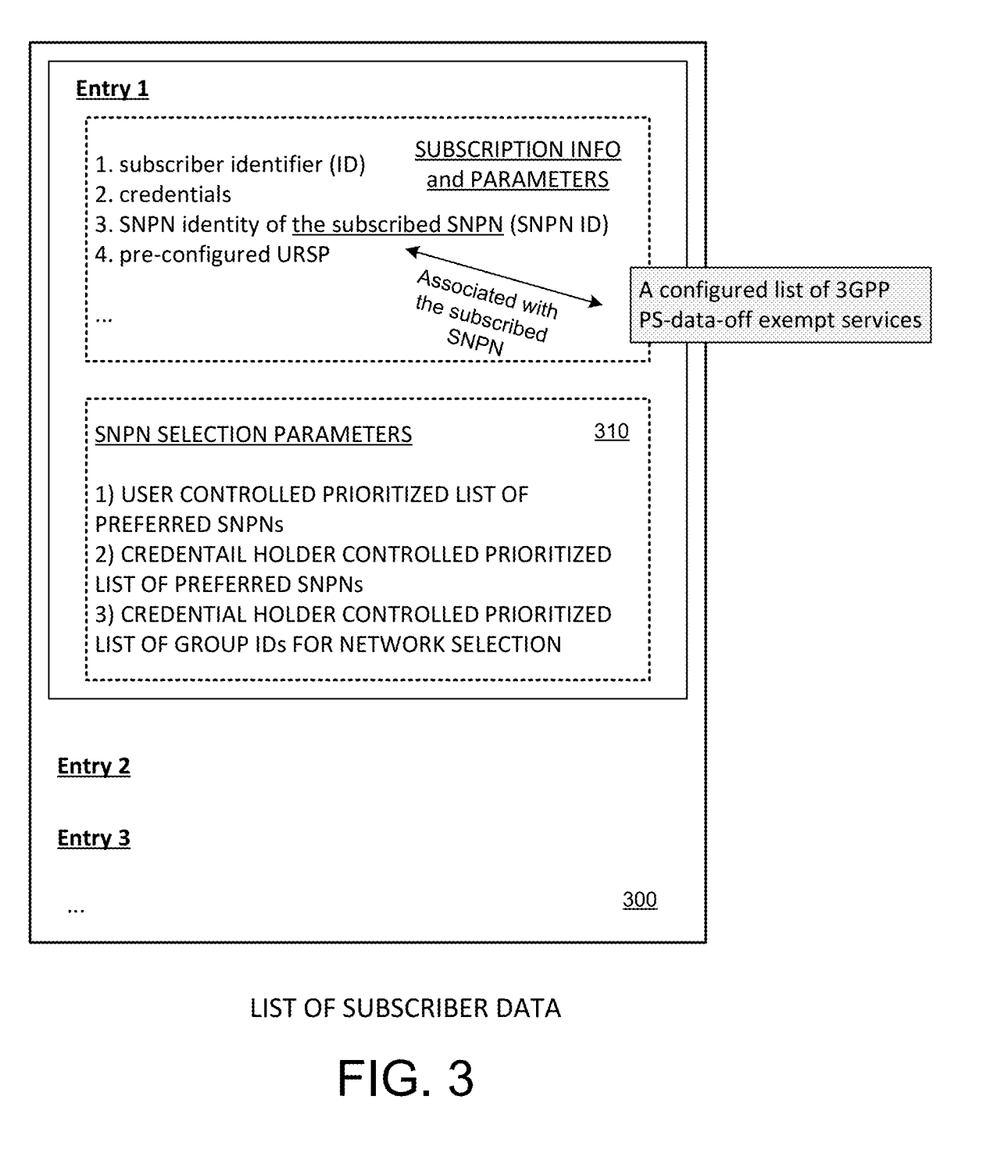
FIG. 3 illustrates an example of a UE that is configured with a list of subscriber data that includes SNPN selection parameters for supporting access to an SNPN using credentials from a credential holder.

FIG. 3 illustrates an example of a UE that is configured with a list of subscriber data 300 that includes SNPN selection parameters for supporting access to an SNPN using credentials from a credential holder. Under the current 3GPP specification, a UE is configured with the "list of subscriber data" 300 containing one or more entries. Each entry (e.g., Entry 1) of the "list of subscriber data" consists of subscription information and parameters including: 1) a subscriber identifier in the form of a SUPI with the SUPI format "network specific identifier" containing a network-specific identifier; 2) credentials; 3) an SNPN identity of the subscribed SNPN; and 4) a pre-configured URSP.

Figure 3A:
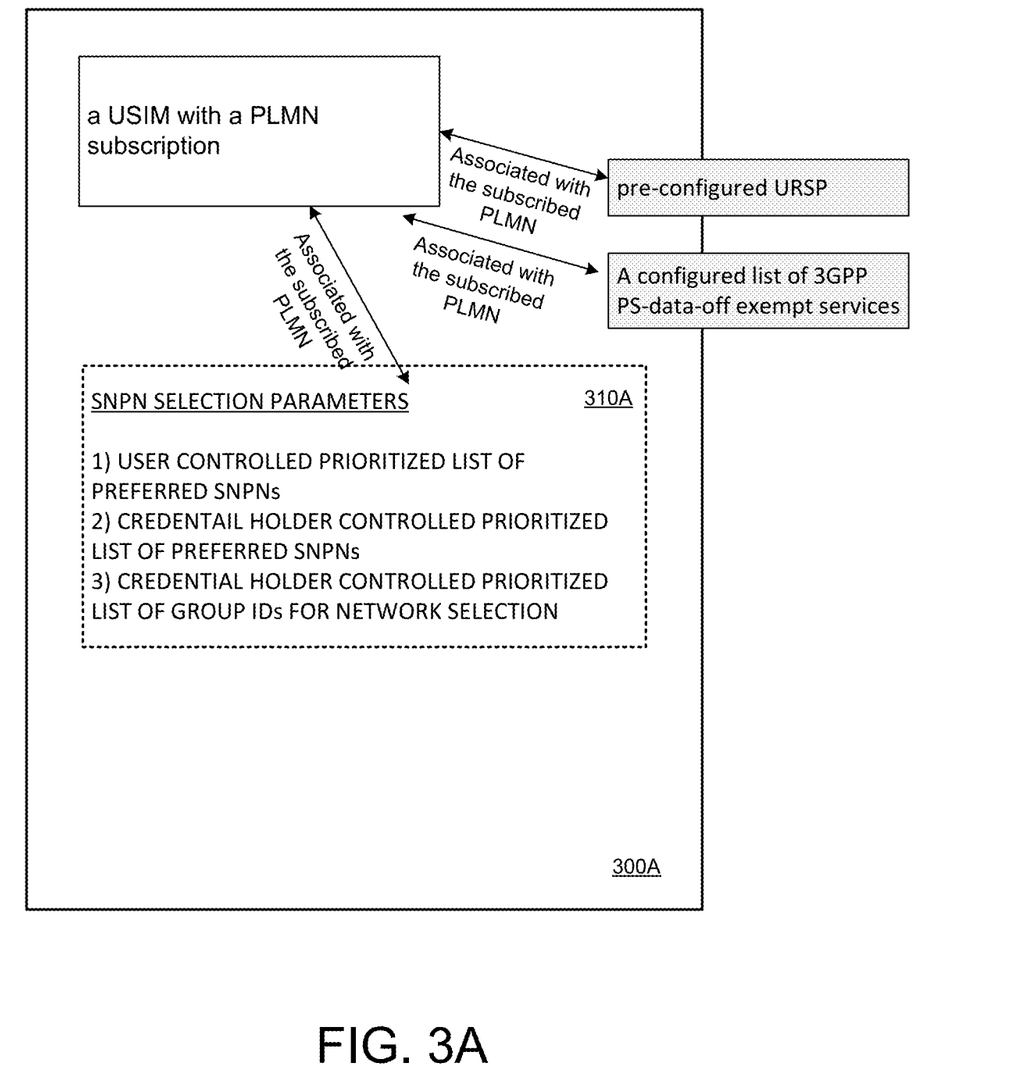
FIG. 3A illustrates an example of a UE has a USIM with a PLMN subscription that is configured with SNPN selection parameters associated with the PLMN subscription for supporting access to an SNPN using credentials from a credential holder.

FIG. 3A illustrates an example of a UE has a USIM with a PLMN subscription 300A that is configured with SNPN selection parameters 310A associated with the PLMN subscription for supporting access to an SNPN using credentials from a credential holder. There is also a pre-configured URSP associated with the PLMN subscription and a configured list of 3GPP PS data off exempt services associated with the PLMN subscription.

The PS_Data_Off feature prevents transport via 3GPP access of all IP packets except those related to 3GPP PS_Data_Off Exempt services. A configured list of 3GPP PS_Data_Off exempt services configured in the UE is to be used for (associated with) the SNPN of the selected entry. In case of SNPN subscription, a UE that supports 3GPP PS_Data_Off can be configured with up to two lists of 3GPP PS_Data_Off exempt services for each subscribed SNPN whose entry exists in the "list of subscriber data": a) a list of 3GPP PS_Data_Off exempt services to be used in the subscribed SNPN; and b) a list of 3GPP PS_Data_Off exempt services to be used in the non-subscribed SNPN. When the 3GPP PS_Data_Off UE status is "activated", the UE does not send uplink IP packets via 3GPP access. However, there is an exception for those services indicated in the list of 3GPP PS_Data_Off exempt services to be used in the non-subscribed SNPN, configured for the selected entry of "list of subscriber data", when the UE is in a non-subscribed SNPN and the list of 3GPP PS_Data_Off exempt services to be used in the non-subscribed SNPN is configured for the selected entry of "list of subscriber data".

Optionally, if the SNPN-enabled. UE supports access to an SNPN using credentials from a credential holder, then an entry of the list of subscriber data may consist of SNPN selection parameters for the purpose of access to an SNPN using credentials from the credential holder. As depicted by 310 in FIG. 3, the SNPN selection parameters consist of: 1) a user controlled prioritized list of preferred SNPNs, where each entry contains an SNPN identity; 2) a credential holder controlled prioritized list of preferred SNPNs, where each entry contains an SNPN identity; and/or 3) a credential holder controlled prioritized list of Group IDs for Network Selection (GINs). Besides, if the SNPN-enabled UE supports access to an SNPN using credentials from a credential holder and has a USIM with a PLMN subscription 300A in FIG. 3A, then a SNPN selection parameters 310A associated with the PLMN subscription for the purpose of access to an SNPN using credentials from the credential holder can be configured in the UF. As depicted by 310A in FIG. 3, the SNPN selection parameters consist of: 1) a user controlled prioritized list of preferred SNPNs, where each entry contains an SNPN identity; 2) a credential holder controlled prioritized list of preferred SNPNs, where each entry contains an SNPN identity; and/or 3) a credential holder controlled prioritized list of Group IDs for Network Selection (GINs).

A UE may access a selected SNPN using credentials provided by a subscribed SNPN/PLMN (acting as a credential holder) if certain conditions are met. In a first example, if a first subscribed. SNPN entry/PLMN subscription having/associating a list of user controlled preferred SNPN that includes a second SNPN ID, then a UE can access the second SNPN using credentials from the first SNPN/PLMN. In a second example, if a first subscribed. SNPN entry/PLMN subscription having/associating a list of credential holder controlled preferred SNPN that includes a second SNPN ID, then a UE can access the second. SNPN using credentials from the first SNPN/PLMN. In a third example, if a first subscribed SNPN entry/PLMN subscription having/associating a list of GINs that includes a GIN and a second SNPN broadcasts the same GIN, then a UE can access the second SNPN using credentials from the first SNPN/PLMN. In a fourth example, if a second SNPN broadcasts an indication that the SNPN allows registration attempts from UEs that are not explicitly configured to select SNPN, then a UE can access the second. SNPN using credentials from a first subscribed SNPN/PLMN of a selected entry/PLMN subscription.

Figure 4:
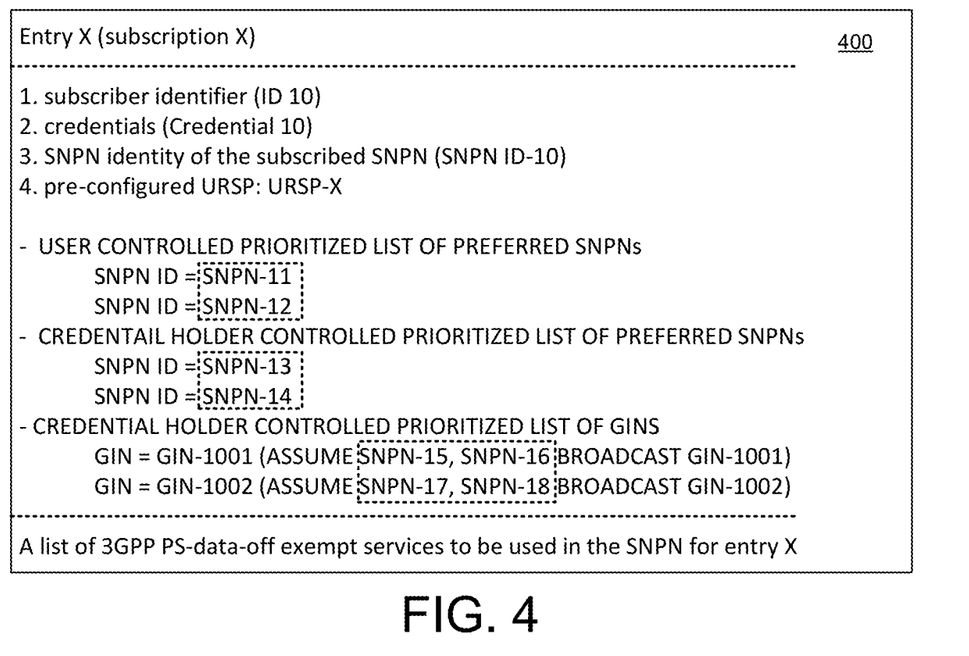
FIG. 4 illustrates embodiments of handling parameters of a subscribed SNPN by a UE under an example of a list of subscriber data.

FIG. 4 illustrates embodiments of handling parameters of a subscribed SNPN by a UE under an example of a list of subscriber data (for subscribed PLMN case, similar handlings are applied). Under the example of FIG. 4, the list of subscriber data 400 comprises an Entry X. Entry X (subscription X) contains a subscriber identifier (ID #10), credentials (Credential #10), SNPN identity of the subscribed SNPN (SNPN ID-#10) and a pre-configured URSP-X. Additionally, a configured list of 3GPP PS_Data_Off exempt services-X to be used for (associated with) the SNPN of the selected entry is configured in the UE. In addition, the SNPN selection parameters of Entry X contains 1) the USER CONTROLLED PRIORITIZED LIST OF PREFERRED SNPNs: SNPN ID=SNPN-11, SNPN-12); 2) the CREDENTAIL HOLDER CONTROLLED PRIORITIZED LIST OF PREFERRED SNPNs: SNPN ID=SNPN-13, SNPN-14; the CREDENTAIL HOLDER CONTROLLED PRIORITIZED LIST OF GINs: GIN=GIN-1001 (assume SNPN-15 and SNPN-16 broadcast GIN-1001), and GIN=GIN-1002 (assume SNPN-17 and SNPN-18 broadcast GIN-1002). As a result, a UE can potentially access SNPN-11, SNPN-12, SNPN-13, SNPN-14, SNPN-15, SNPN-16, SNPN-17, and SNPN-18 using credentials from the subscribed SNPN-10 (the CH) of Entry X in the list of subscriber data.

If UE selects subscription X (Entry X of subscribed SNPN-10), then UE can select any SNPN from SNPN-10 to SNPN-18 and attempt to register to the selected SNPN using credentials supplied by SNPN-10. Later on, upon successful registration, UE runs an application or makes a voice call and needs to evaluate URSP to determine the parameters of the PDU session to be established. UE may also need to know which service belongs to the list of 3GPP PS_Data_Off exempt services. While Entry X of the list of subscribed data has a pre-configured URSP-X and a configured list of 3GPP PS_Data_Off exempt services-X exists for the Entry X, the UE should choose to use another URSP-Y, and another list of 3GPP PS_Data_Off exempt services-Y, that are specifically configured for the selected SNPN, and are different from the URSP-X and the list of 3GPP PS_Data_Off exempt services-X.

In one embodiment, UE selects SNPN-11 and using credentials from the subscribed SNPN-10 of Entry X to register to SNPN-11. Upon successful registration, UE evaluates URSP-Y to determine parameters of a PDU session to be established. UE uses a list of 3GPP PS_Data_Off exempt services-Y for determining exempt services. In another embodiment, UE selects SNPN-12, SNPN-13, SNPN-14 . . . or SNPN-18 and using credentials from the subscribed SNPN-10 of Entry X to register to SNPN-12, SNPN-13, SNPN-14 . . . or SNPN-18. Upon successful registration, UE evaluates URSP-Z to determine parameters of a PDU session to be established. UE uses a list of 3GPP PS_Data_Off exempt services-Z for determining exempt services. While URSP-Z is different from URSP-X, URSP-Z may either be the same as or different from URSP-Y. Similarly, while the list of 3GPP PS_Data_Off exempt services-Z is different from the list of 3GPP PS_Data_Off exempt services-X, the list of 3GPP PS_Data_Off exempt services-Z may either be the same as or different from the list of 3GPP PS_Data_Off exempt services-Y.

In yet another embodiment, the list of subscriber data has another Entry Y (not shown) for another subscribed SNPN-20. UE selects SNPN-11 and using credentials from the subscribed SNPN-20 of Entry Y to register to SNPN-11. Upon successful registration to SNPN-11, UE evaluates URSP-Z to determine parameters of a PDU session to be established. UE also uses a list of 3GPP PS_Data_Off exempt services-Z for determining exempt services. While URSP-Z is different from pre-configured URSP-X, URSP-Z may either be the same as or different from URSP-Y. Similarly, while the list of 3GPP PS_Data_Off exempt services-Z is different from the list of 3GPP PS_Data_Off exempt services-X, the list of 3GPP PS_Data_Off exempt services-Z may either be the same as or different from the list of 3GPP PS_Data_Off exempt services-Y.

Figure 5:
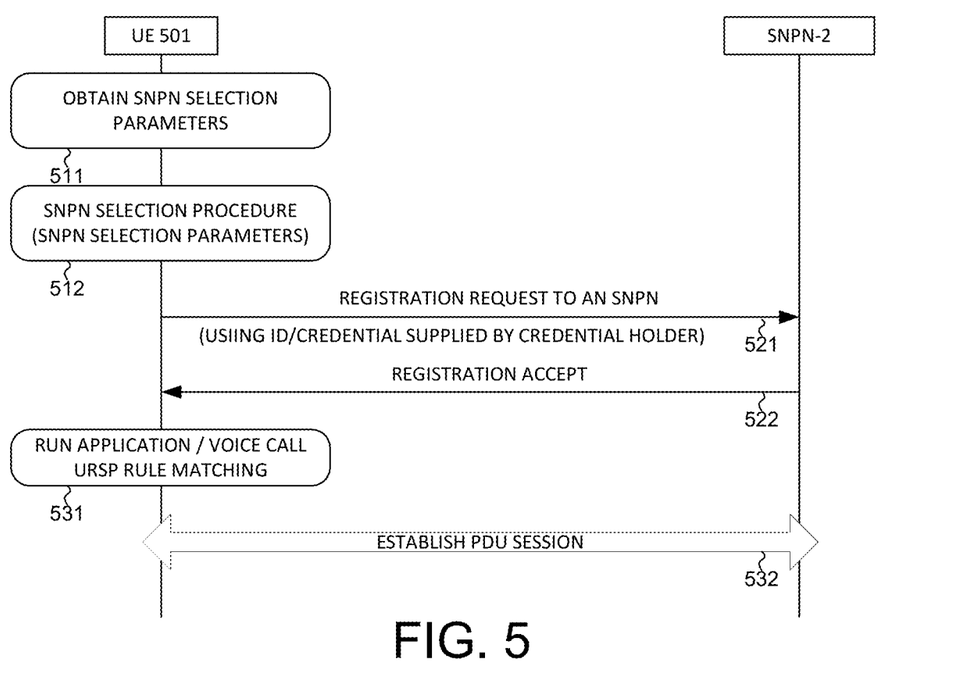
FIG. 5 illustrates an SNPN selection and registration procedure and a subsequent PDU session establishment when UE registers to a selected SNPN using credentials supplied by a credential holder.

FIG. 5 illustrates an SNPN selection and registration procedure and a subsequent PDU session establishment when UE registers to a selected SNPN using credentials supplied by a credential holder. In step 511, UE 501 obtains SNPN selection parameters from a list of subscriber data configured by the network, or from PLMN subscription information stored in a USIM card of the UE, and the PLMN subscription is associated with the SNPN selection parameters. In step 512, UE 501 selects SNPN-2 according to an SNPN selection procedure.

For example, UE 501 selects an entry X of the "list of subscriber data" as selected subscription, the SNPN ID of the subscribed SNPN of this selected entry X is a first SNPN-1. UE 501 then uses the selected subscription, based on the SNPN selection parameters in the selected entry X of the "list of subscriber data", UE 501 selects an SNPN whose SNPN ID is a second SNPN-2, and registers to the second SNPN-2. The second SNPN-2 can be selected because: 1) SNPN-2 broadcasts the indication that access using credentials from a credentials holder is supported and which is identified by an SNPN identity contained in the user controlled prioritized list of preferred SNPNs in the selected entry X of the "list of subscriber data"; 2) SNPN-2 broadcasts the indication that access using credentials from a credentials holder is supported and which is identified by an SNPN identity contained in the credentials holder controlled prioritized list of preferred SNPNs in the selected entry X of the "list of subscriber data"; or 3) SNPN-2 broadcasts the indication that access using credentials from a credentials holder is supported and broadcast a GIN contained in the credentials holder controlled prioritized list of GINs in the selected entry X of the "list of subscriber data"; or 4)

SNPN-2 broadcasts an indication that the SNPN-2 allows registration attempts from MSs that are not explicitly configured to select the SNPN. In other words, UE 501 is allowed to access SNPN-2 using credentials supplied by SNPN-1—the subscribed SNPN acting as CH.

In step 521, UE 501 sends a registration request message to the selected SNPN-2, which is the second SNPN. The UE uses credentials supplied by the credential holder, which is the first SNPN-1, for the registration. In step 522, upon verifying the registration credentials, SNPN-2 accepts the registration request. SNPN-2 thus sends a registration accept message to UE 501, indicating that UE 501 is authorized to access this SNPN-2 using credentials supplied by SNPN-1. Upon successful registration, UTE 501 is able to run application and perform data transmission and reception in SNPN-2 over established PDU sessions. The UE upper layers trigger URSP rule matching, which enables the UE to determine how a certain application should be handled in the context of an existing or new Protocol Data Unit (PDU) session. For example, in step 531, UE 501 runs an application or initiates a voice call. UE 501 needs to evaluate URSP to determine parameters of the PDU session to be established (step 532). As explained earlier, in the list of subscriber data, the selected entry X for the subscribed SNPN-1 has a pre-configured URSP-X for UE to perform URSP rule matching and evaluation. However, since the UE is registered to SNPN-2, UE 501 therefore uses, another URSP-Y for URSP rule matching and evaluation, and URSP-Y is different from URSP-X. Similarly, in the list of subscriber data, the selected entry X for the subscribed SNPN-1 has an associated configured list of 3GPP PS_Data_Off exempt services-X. However, since the UF registered to SNPN-2, UE 501 therefore uses another list of 3GPP PS_Data_Off exempt services-Y, and the list-Y is different from the list-X.

Figure 6:
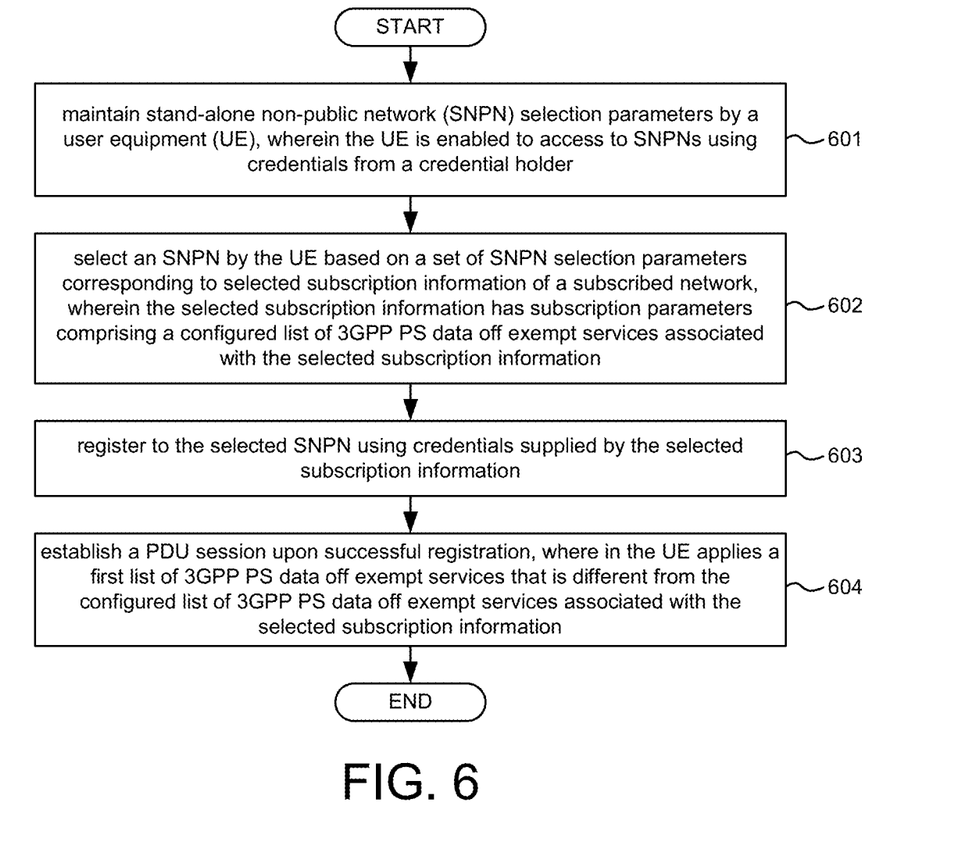
FIG. 6 is a flow chart of a method of handling parameters of a subscribed network by a UE upon accessing to a selected SNPN using credentials from a credential holder in accordance with one novel aspect.

FIG. 6 is a flow chart of a method of handling parameters of a subscribed SNPN by a UE upon register to a selected SNPN using credentials from a credential holder in accordance with one novel aspect. In step 601, the UE maintains stand-alone non-public network (SNPN) selection parameters. The UE is enabled to access to SNPNs using credentials from a credential holder. In step 602, the UE selects an SNPN based on a set of SNPN selection parameters corresponding to selected subscription information of a subscribed network. The selected subscription information has subscription parameters comprising a configured list of 3GPP PS_Data_Off exempt services associated with the selected subscription information. In step 603, the UE registers to the selected SNPN using credentials supplied by the selected subscription information. In step 604, the UE applies a first list of 3GPP PS_Data_Off exempt services that is different from the configured list of 3GPP PS_Data_Off exempt services associated with the selected subscription information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    maintaining one or more sets of stand-alone non-public network (SNPN) selection parameters by a user equipment (UE), wherein the UE is enabled to access to SNPNs using credentials from a credential holder;
    selecting an SNPN by the UE based on a set of the one or more sets of SNPN selection parameters corresponding to selected subscription information of a subscribed network, wherein the selected subscription information has subscription parameters comprising a configured list of 3GPP PS_Data_Off exempt services associated with the selected subscription information to be used in the subscribed SNPN;
    successfully registering to the selected SNPN using credentials supplied by the selected subscription information; and
    establishing a PDU session with the selected SNPN, wherein the UE applies a first list of 3GPP PS_Data_Off exempt services to be used in a non-subscribed SNPN that is different from the configured list of 3GPP PS_Data_Off exempt services associated with the selected subscription information to be used in the subscribed SNPN.

2. The method of claim 1, wherein the selected subscription information is corresponding to an entry selected from a list of subscriber data, and wherein the UE obtains the SNPN selection parameters from the list of subscriber data.

3. The method of claim 2, wherein the subscribed network of the subscription information is a subscribed SNPN acting as the credential holder for accessing the selected SNPN.

4. The method of claim 1, wherein the selected subscription information is corresponding to a universal subscriber identity module (USIM) with a public land mobile network (PLMN) subscription, and wherein the UE obtains the SNPN selection parameters from configuration associated with the PLMN subscription information.

5. The method of claim 4, wherein the subscribed network of the subscription information is a subscribed PLMN acting as the credential holder for accessing the selected SNPN.

6. The method of claim 1, wherein the SNPN selection parameters comprises at least one of a user controlled prioritized list of preferred SNPNs, a credential holder controlled prioritized list of preferred SNPNs, and a credential holder controlled prioritized list of group IDs for network selection (GIN).

7. The method of claim 1, wherein the UE selects a second SNPN to access using credentials supplied by the same selected subscription information, wherein the UE applies a second list of 3GPP PS_Data_Off exempt services that is either the same or different from the first list of 3GPP PS_Data_Off exempt services.

8. The method of claim 1, wherein the UE selects the same SNPN to access using credentials supplied by a second selected subscription information, wherein the UE applies a second list of 3GPP PS_Data_Off exempt services that is either the same or different from the first list of 3GPP PS_Data_Off exempt services.

9. The method of claim 1, wherein the subscription parameters further comprise a pre-configured UE route selection policy (URSP).

10. The method of claim 9, wherein the UE evaluates another URSP that is different from the pre-configured URSP upon successful registration.

11. A User Equipment (UE), comprising:
    a control and configuration circuit that maintains one or more sets of stand-alone non-public network (SNPN) selection parameters, wherein the UE is enabled to access to SNPNs using credentials from a credential holder;
    an SNPN handling circuit that selects an SNPN based on a set of the one or more sets of SNPN selection parameters corresponding to selected subscription information of a subscribed network, wherein the selected subscription information has subscription parameters comprising a configured list of 3GPP PS_Data_Off exempt services associated with the selected subscription information to be used in the subscribed SNPN;

a registration circuit that successfully registers to the selected SNPN using credentials supplied by the selected subscription information; and a PDU session handling circuit that establishes a PDU session with the selected SNPN, wherein the UE applies a first list of 3GPP PS_Data_Off exempt services to be used in a non-subscribed SNPN that is different from the configured list of 3GPP PS_Data_Off exempt services associated with the selected subscription information to be used in the subscribed SNPN.

12. The UE of claim 11, wherein the selected subscription information is corresponding to an entry selected from a list of subscriber data, and wherein the UE obtains the SNPN selection parameters from the list of subscriber data.

13. The UE of claim 12, wherein the subscribed network of the subscription information is a subscribed SNPN acting as the credential holder for accessing the selected SNPN.

14. The UE of claim 11, wherein the selected subscription information is corresponding to a universal subscriber identity module (USIM) with a public land mobile network (PLMN) subscription, and wherein the UE obtains the SNPN selection parameters from configuration associated with the PLMN subscription information.

15. The UE of claim 14, wherein the subscribed network of the subscription information is a subscribed PLMN acting as the credential holder for accessing the selected SNPN.

16. The UE of claim 11, wherein the SNPN selection parameters comprises at least one of a user controlled prioritized list of preferred SNPNs, a credential holder controlled prioritized list of preferred SNPNs, and a credential holder controlled prioritized list of group IDs for network selection (GIN).

17. The UE of claim 11, wherein the UE selects a second SNPN to access using credentials supplied by the same selected subscription information, wherein the UE applies a second list of 3GPP PS_Data_Off exempt services that is either the same or different from the first list of 3GPP PS_Data_Off exempt services.

18. The UE of claim 11, wherein the UE selects the same SNPN to access using credentials supplied by a second selected subscription information, wherein the UE applies a second list of 3GPP PS_Data_Off exempt services that is either the same or different from the first list of 3GPP PS_Data_Off exempt services.

19. The UE of claim 11, wherein the subscription parameters further comprise a pre-configured UE route selection policy (URSP).

20. The UE of claim 19, wherein the UE evaluates another URSP that is different from the pre-configured URSP upon successful registration.

* * * * *